United States Patent
Nasir et al.

(10) Patent No.: US 11,005,925 B2
(45) Date of Patent: May 11, 2021

(54) LOAD BALANCING WITH POWER OF RANDOM CHOICES

(71) Applicant: INTERNATIONAL BUSINESS MACHINES CORPORATION, Armonk, NY (US)

(72) Inventors: Muhammad Anis Uddin Nasir, Stockholm (SE); Hiroshi Horii, Tokyo (JP); Takayuki Osogami, Yamato (JP); Rudy Raymond Harry Putra, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 15/907,759

(22) Filed: Feb. 28, 2018

(65) Prior Publication Data
US 2019/0268405 A1    Aug. 29, 2019

(51) Int. Cl.
*H04L 29/08*    (2006.01)

(52) U.S. Cl.
CPC ........ *H04L 67/1023* (2013.01); *H04L 67/101* (2013.01); *H04L 67/1008* (2013.01)

(58) Field of Classification Search
CPC ............. H04L 67/1023; H04L 67/1008; H04L 67/101; H04L 67/10; H04L 67/104; H04L 67/1002; H04L 67/1097; H04L 67/1012; H04L 67/1021; H04L 51/14; H04L 43/08; H04L 43/16; H04L 43/10; H04L 47/125; H04L 47/783; G06F 16/285; H04W 28/08

See application file for complete search history.

(56) References Cited

U.S. PATENT DOCUMENTS

| | | | |
|---|---|---|---|
| 9,455,967 | B2 | 9/2016 | Roitshtein et al. |
| 2006/0047751 | A1* | 3/2006 | Chen ........................ H04L 47/10 709/205 |
| 2012/0272025 | A1* | 10/2012 | Park ...................... G06F 3/0608 711/162 |
| 2014/0310418 | A1* | 10/2014 | Sorenson, III ...... H04L 67/1038 709/226 |

(Continued)

OTHER PUBLICATIONS

Paul Werstein, "Load Balancing in a Cluster Computer" 0-7695-2736-1/06 $20.00 © 2006, pp. 1-9 (Year: 2006).*

(Continued)

*Primary Examiner* — Glenton B Burgess
*Assistant Examiner* — Rachel J Hackenberg
(74) *Attorney, Agent, or Firm* — Tutunjian & Bitetto, P.C.; Randall Bluestone

(57) ABSTRACT

A computer-implemented method for balancing loads of a distributed system having a plurality of nodes via a load balancing scheme is presented. The method includes determining an average load of the plurality of nodes once a request is sent to the distributed system, determining a threshold load value based on the determined average load of the plurality of nodes, and randomly selecting a node of the plurality of nodes based on a hash value. The method further includes determining whether the randomly selected node is above or below the threshold load value, and, if the randomly selected node is above the threshold load value, randomly selecting another node, and if the randomly selected node is below the threshold load value, then selecting such node to process the request.

20 Claims, 11 Drawing Sheets

(56) References Cited

U.S. PATENT DOCUMENTS

2015/0350087 A1 12/2015 Hong et al.
2016/0099872 A1* 4/2016 Kim ..................... H04L 47/125
                                                            370/235

OTHER PUBLICATIONS

Mirrokni et al., "Consistent Hashing with Bounded Loads," Proceedings of the 29th Annual ACM-SIAM Symposium on Discrete Algorithms. Jan. 7-10, 2018. (pp. 1-37.).

Nasir et al., "Load Balancing for Skewed Streams on Heterogeneous Clusters," Cornell University Library. Computer Science. Distributed, Parallel, and Cluster Computing. arXiv:1706.09073v2. Oct. 1, 2017. (pp. 1-12.).

* cited by examiner

LOAD BALANCING WITH POWER OF RANDOM CHOICES

BACKGROUND

Technical Field

The present invention relates generally to load balancing, and more specifically, to load balancing with the power of random choices.

Description of the Related Art

Conventional load balancing systems can implement various mechanisms in order to distribute load globally over a cluster of machines. These systems usually redistribute resources on a fixed schedule or by adding additional resources for overburdened machines. While these approaches can be satisfactory for addressing long-term load patterns, the long interval between analysis of the need for redistribution of resources inherently limits the effectiveness of the system when short-term load spikes occur.

SUMMARY

In accordance with one embodiment, a computer-implemented method executed by a processor for balancing loads of a distributed system having a plurality of nodes via a load balancing scheme is provided. The computer-implemented method includes determining an average load of the plurality of nodes once a request is sent to the distributed system, determining a threshold load value based on the determined average load of the plurality of nodes, randomly selecting a node of the plurality of nodes based on a hash value, determining whether the randomly selected node is above or below the threshold load value, and if the randomly selected node is above the threshold load value, randomly selecting another node, and if the randomly selected node is below the threshold load value, then selecting such node to process the request.

In accordance with another embodiment, a load balancing system for balancing loads via a load balancing scheme is provided. The load balancing system includes a distributed system having a plurality of nodes, a plurality of computing devices transmitting a plurality of requests to the distributed system via one or more networks, and a load balance computation device for executing the load balancing scheme to: determine an average load of the plurality of nodes once a request of the plurality of requests is sent to the distributed system, determine a threshold load value based on the determined average load of the plurality of nodes, randomly select a node of the plurality of nodes based on a hash value, determine whether the randomly selected node is above or below the threshold load value; and, if the randomly selected node is above the threshold load value, randomly select another node, and if the randomly selected node is below the threshold load value, then select such node to process the request.

In accordance with yet another embodiment, a non-transitory computer readable storage medium comprising a computer readable program for balancing loads of a distributed system having a plurality of nodes via a load balancing scheme is provided. The non-transitory computer readable storage medium when executed on a computer causes the computer to perform the steps of determining an average load of the plurality of nodes once a request is sent to the distributed system, determining a threshold load value based on the determined average load of the plurality of nodes, randomly selecting a node of the plurality of nodes based on a hash value, determining whether the randomly selected node is above or below the threshold load value, and if the randomly selected node is above the threshold load value, randomly selecting another node, and if the randomly selected node is below the threshold load value, then selecting such node to process the request.

Furthermore, embodiments can take the form of a related computer program product, accessible from a computer-usable or computer-readable medium providing program code for use, by or in connection with a computer or any instruction execution system. For the purpose of this description, a computer-usable or computer-readable medium may be any apparatus that may include means for storing, communicating, propagating or transporting the program for use, by or in a connection with the instruction execution system, apparatus, or device.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The invention will provide details in the following description of preferred embodiments with reference to the following figures wherein.

DETAILED DESCRIPTION

Figure 1:
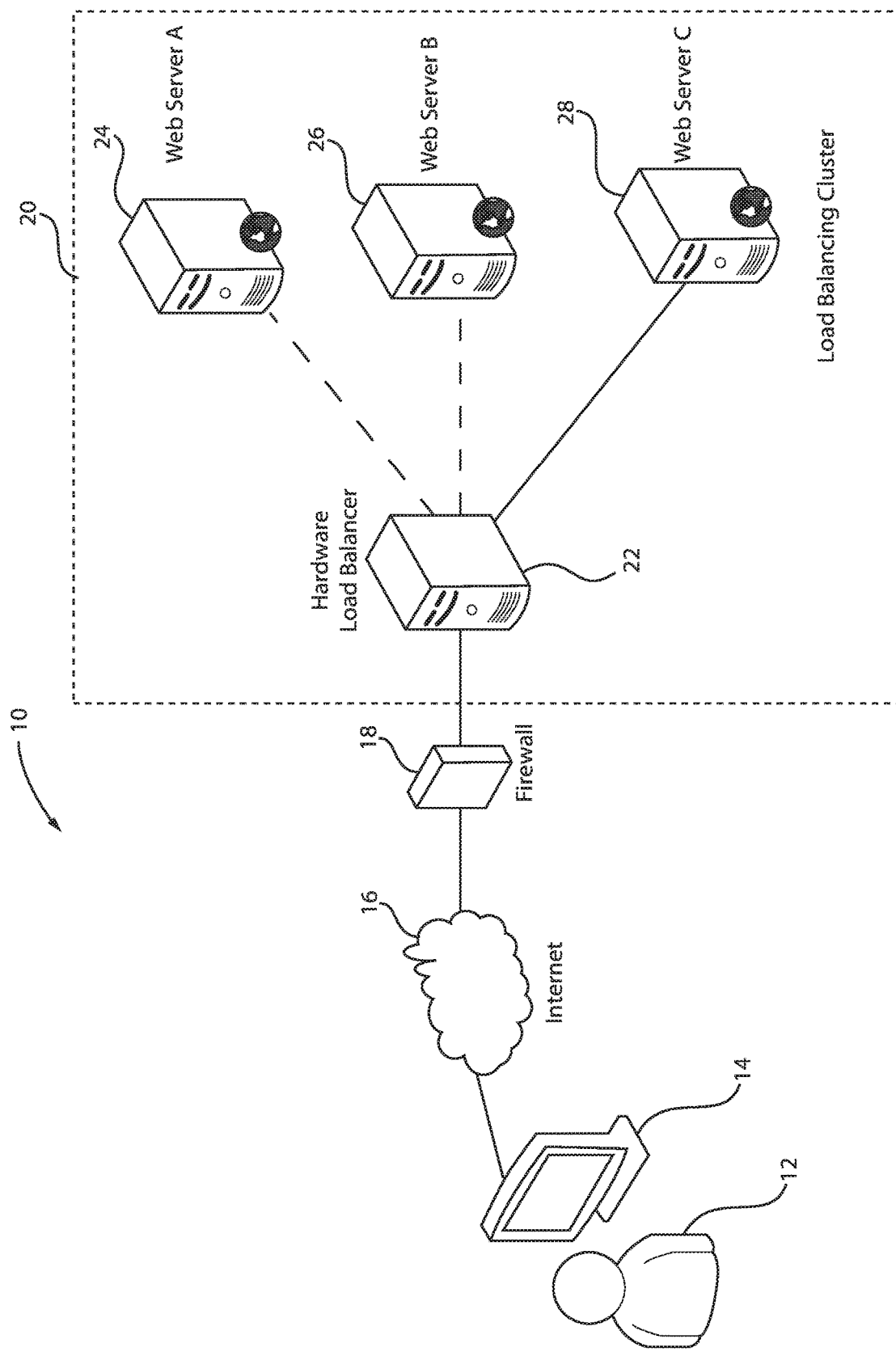
FIG. 1 is a block/flow diagram of an exemplary system network where a single user sends a request to a distributed system, in accordance with embodiments of the present invention.

Embodiments in accordance with the present invention provide methods and devices for load balancing. Load balancing is a solution that can be implemented on a network between servers and clients to distribute requests evenly among resources hosted on a pool of servers. Load balancing solutions use various algorithms, and comprehensive monitoring of the network, to make intelligent choices about how best to distribute client requests. In addition to intelligently distributing requests over a server pool, load balancing infrastructure helps maximize availability of the services and applications that are presented to clients. To maximize availability, the health of servers and hosted services are monitored in real time. If a server, or just an individual service or application, is not responding in a timely manner the load balancer redirects client traffic away from that server or application to other available resources. When coupled with virtualized infrastructure and on demand provisioning, additional server capacity can be brought online to fulfil requests when the load on servers is high. This allows more resources to be made available when demand goes up, and reduced again when demand falls. This ensures that response times from services are optimal throughout periods with fluctuating needs.

Embodiments in accordance with the present invention provide methods and devices for executing a load balancing algorithm. Load balancing mitigates various issues that can arise on a network that is serving requests from clients. Load balancing can help with at least the following issues that are necessary for good service delivery, that is, network response times, data management, smoothing out access spikes, providing redundancy and resilience, scalability, security, orchestration, reliable remote access, and serving geographically distributed clients.

Embodiments in accordance with the present invention provide methods and devices for implementing a power of random choices (PoRC) load balancing scheme. The PoRC provides bounded imbalance in terms of number of tasks assigned to each machine and keeps the memory, as well as the communication and aggregation cost low. PoRC introduces the notion of continuous capacity for each machine and assigns the incoming tasks randomly to any machine with spare capacity. PoRC has an input parameter epsilon ($\epsilon$). The capacity of the machines at any time is defined as the ceiling of the average load times ($1+\epsilon$). Further, a set of random permutation of machines for each task is generated employing a set of hash functions. PoRC provides a tradeoff between imbalance and memory using the parameter $\epsilon$. Also, PoRC generalizes both hashing and round robin, i.e., $\epsilon=0$ equals round robin and $\epsilon=\infty$ equals key grouping.

Embodiments in accordance with the present invention provide methods and devices for implementing the load balancing scheme on a distributed stream processing engine, such as Apache Storm. Apache Storm is a free and open source distributed real-time computation system. Apache Storm makes it easy to reliably process unbounded streams of data.

Embodiments in accordance with the present invention provide methods and devices for employing the load balancing scheme to optimize Internet of Things (IoT) applications. The Internet of Things (IoT) enables advanced connectivity of computing and embedded devices through internet infrastructure. IoT involves machine-to-machine communications (M2M), where it is important to continuously monitor connected machines to detect any anomaly or bug, and resolve them quickly to minimize downtime.

IoT is an advanced automation and analytics system which exploits networking, sensing, big data, and artificial intelligence technology to deliver complete systems for a product or service. These systems allow greater transparency, control, and performance when applied to any industry or system. IoT systems have applications across industries through their unique flexibility and ability to be suitable in any environment. IoT systems enhance data collection, automation, operations, and much more through smart devices and powerful enabling technology. IoT systems allow users to achieve deeper automation, analysis, and integration within a system. IoT systems improve the reach of these areas and their accuracy.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Referring now to the drawings in which like numerals represent the same or similar elements and initially to FIG. 1, an exemplary system network where a single user sends a request to a distributed system is presented, in accordance with embodiments of the present invention.

Distributed systems include multiple autonomous computers or parallel virtual machines that communicate through a computer network, such as a computer cluster having multiple nodes. The machines in a distributed system interact with each other in order to achieve a common goal. In distributed computing, a problem is divided into many tasks, each of which is solved by one or more computers, such as the nodes of a computer cluster. Distributed systems and applications can be applied as various paradigms, including grid computing, utility computing, edge computing, and cloud computing by which users can access the server resources using a computer, netbook, tablet, smart phone, or other device through the Internet.

The exemplary distributed system 10 includes a user 12 operating a computing device 14 that is connected to the Internet 16. To access the load balancing cluster 20, the user 12 may have to go through a firewall 18. The load balancing cluster 20 includes a hardware load balancer 22 that distributes incoming network traffic to a plurality of servers, e.g., web server 24, web server 26, and web server 28. The group of servers 24, 26, 28 can be referred to as a server farm or a server pool.

Modern high-traffic websites serve hundreds of thousands, if not millions, of concurrent requests from users or clients and return the correct text, images, video, or application data, all in a fast and reliable manner. Load balancer 22 is configured to route client requests across all servers capable of fulfilling those requests in a manner that maximizes speed and capacity utilization and ensures that no one server is overworked, which could degrade performance. If a single server goes down, the load balancer 22 redirects traffic to the remaining online servers. When a new server is added to the server group, the load balancer automatically starts to send requests to it. Load balancer 22 thus performs the following functions: distributes client requests or network load efficiently across multiple servers, ensures high availability and reliability by sending requests only to servers that are online, and provides the flexibility to add or subtract servers as demand dictates. Load balancer 22 can be configured to run the power of random choices (PoRC) load balancing scheme described below. Load balancer 22 can be hardware-based of software-based. In a hardware-based cluster, the hardware device controls all of the traffic to the servers in the load balancing cluster. In a software-based load balancer, each of the servers in the load balancing cluster includes software to support the cluster.

Figure 2:
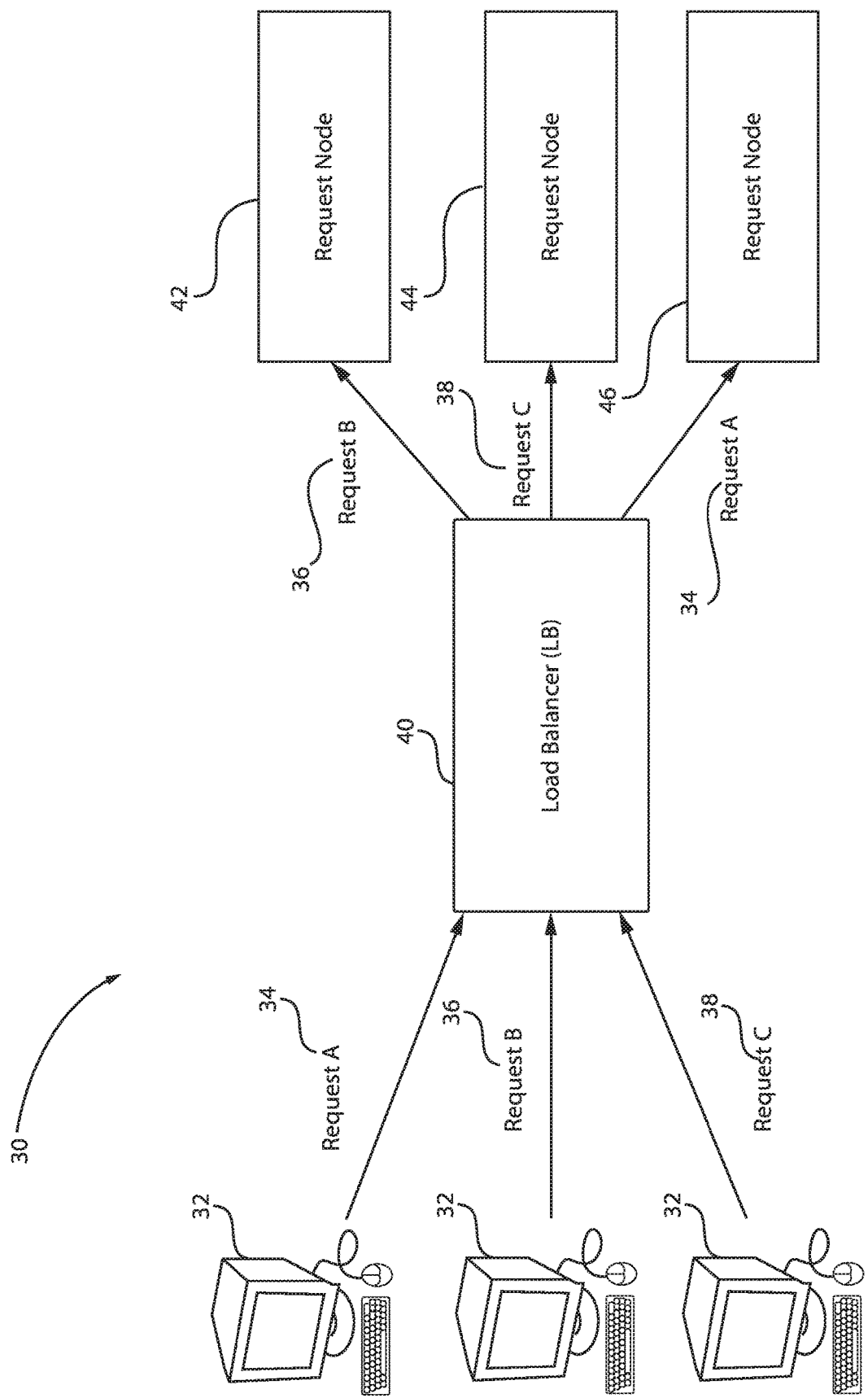
FIG. 2 is a block/flow diagram of an exemplary distributed system with a single load balancer, in accordance with an embodiment of the present invention.

FIG. 2 is a block/flow diagram of an exemplary distributed system 30 with a single load balancer, in accordance with an embodiment of the present invention.

In system 30, a plurality of users 32 can send requests to a plurality of nodes 42, 44, 46. For example, the plurality of users 32 can send a first request 34, a second request 36, and a third request 38. The requests 34, 36, 38 go through a single load balancer 40. The load balancer 40 redirects the first, second, and third requests 34, 36, 38 to the appropriate nodes 42, 44, 46. Load balancer 40 thus distributes the load across a set of nodes responsible for servicing requests. This allows multiple nodes 42, 44, 46 to transparently service the same function in system 30.

For example, the first request 34 is redirected to node 46, the second request 36 is redirected to node 42, and the third request 38 is redirected to node 44. The load balancer 40 thus handles a lot of simultaneous connections and routes those connections to one of the request nodes 42, 44, 46, allowing the system 30 to scale to service more requests by just adding nodes. Load balancer 40 can be configured to run the power of random choices (PoRC) load balancing scheme described below.

Figure 3:
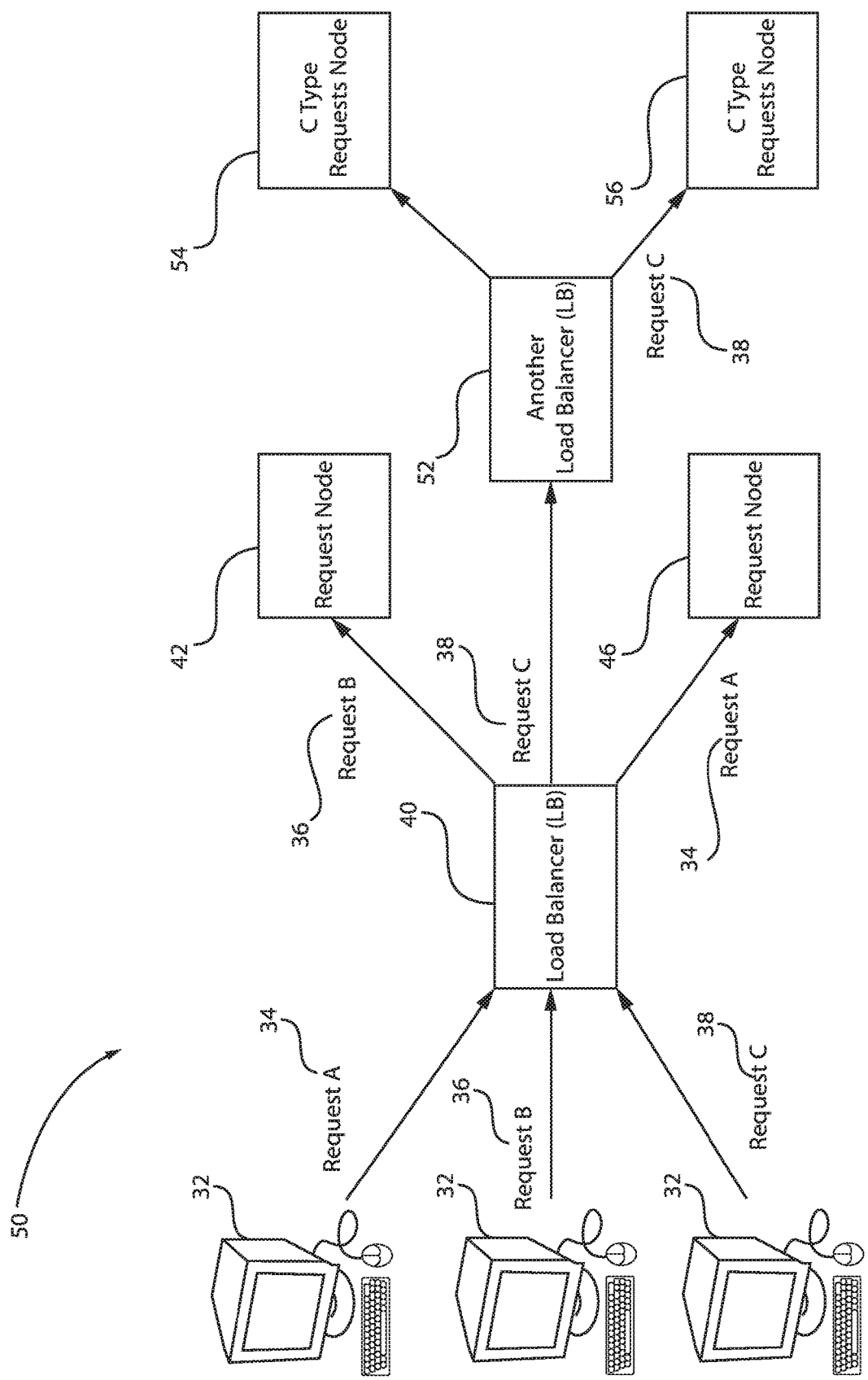
FIG. 3 is a block/flow diagram of an exemplary distributed system with multiple load balancers, in accordance with an embodiment of the present invention.

FIG. 3 is a block/flow diagram of an exemplary distributed system with multiple load balancers, in accordance with an embodiment of the present invention.

In a distributed system, load balancers are often found at the very front of the system, such that all incoming requests are routed accordingly. In a complex distributed system, it is not uncommon for a request to be routed to multiple load balancers as shown in FIG. 3.

In system 50, a plurality of users 32 can send requests to a plurality of nodes 42, 46, 54, 56. For example, the plurality of users 32 can send a first request 34, a second request 36, and a third request 38. The requests 34, 36, 38 go through a load balancer 40. However, load balancer 40 can redirect the third request 38 to a second load balancer 52. The second load balancer 52 can then redirect the third request 38 to either node 54 or node 56. The first load balancer 40 can redirect the first request to node 46 and redirect the second request 36 to node 42. Load balancers 40, 52 can be configured to run the power of random choices (PoRC) load balancing scheme described below.

Figure 4:
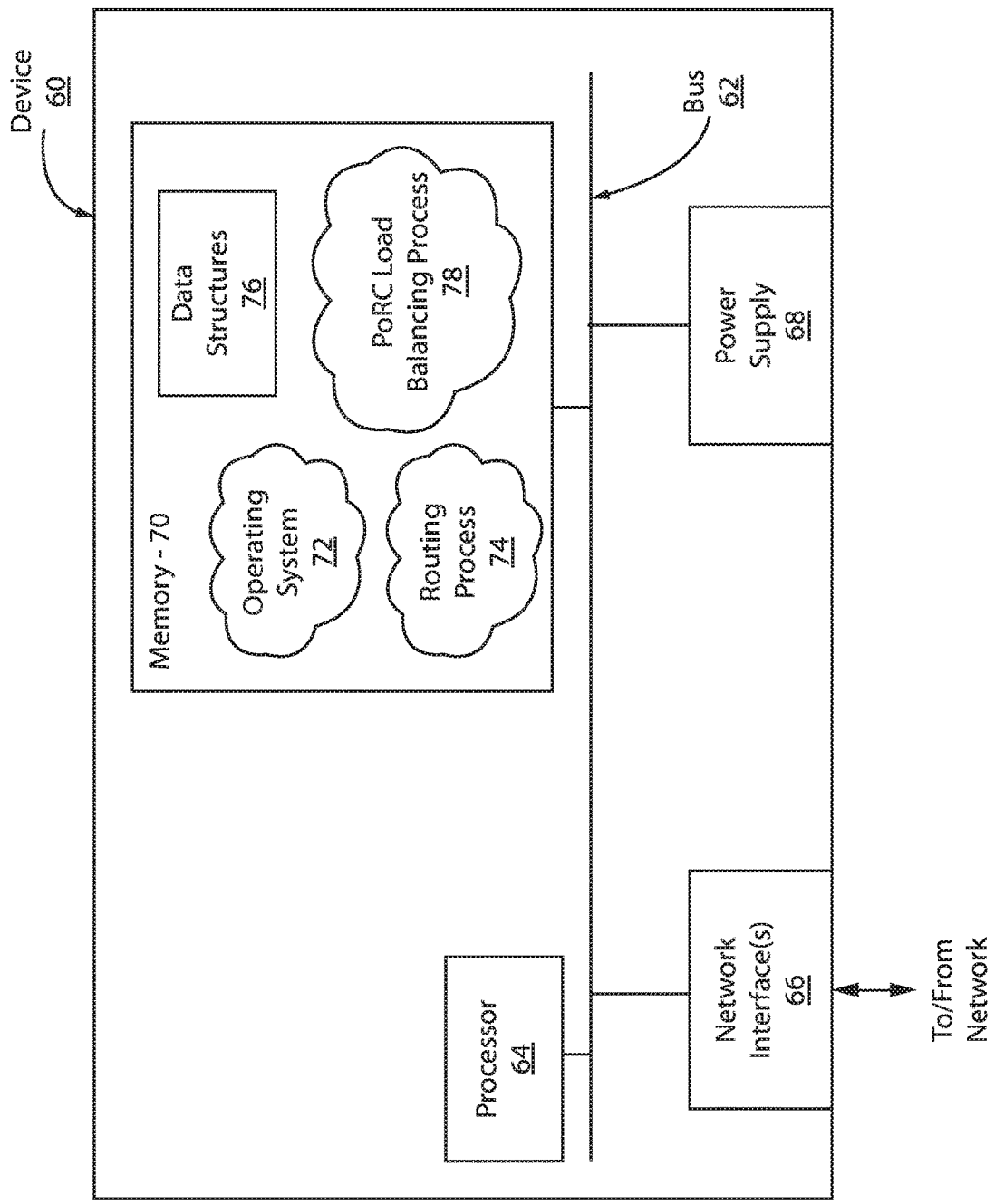
FIG. 4 is a block/flow diagram of an exemplary network device/node, in accordance with an embodiment of the present invention.

FIG. 4 is a block/flow diagram of an exemplary network device/node, in accordance with an embodiment of the present invention.

The example node/device 60 can be used with one or more embodiments described herein, e.g., as any of the nodes shown in FIGS. 1 and 2 above. The device 60 can include one or more network interfaces 66 (e.g., wired, wireless, programmable logic controller (PLC), etc.), at least one processor 64, and a memory 70 interconnected by a system bus 62, as well as a power supply 68 (e.g., a battery, plug-in, etc.).

The network interface(s) 66 include the mechanical, electrical, and signaling circuitry for communicating data over links coupled to the network. The network interfaces 66 can be configured to transmit and/or receive data using a variety of different communication protocols. Note, further, that the nodes can have two different types of network connections, e.g., wireless and wired/physical connections, and that the view herein is merely for illustration. Also, while the network interface 66 is shown separately from power supply 68, for PLC the network interface 66 can communicate through the power supply 68, or can be an integral component of the power supply. In some specific configurations, the PLC signal can be coupled to the power line feeding into power supply 68.

The memory 70 includes a plurality of storage locations that are addressable by the processor 64 and the network interfaces 66 for storing software programs and data structures associated with the embodiments described herein. Note that certain devices can have limited memory or no memory (e.g., no memory for storage other than for programs/processes operating on the device and associated caches). The processor 64 can include hardware elements or hardware logic adapted to execute the software programs and manipulate the data structures 76. An operating system 72, portions of which are usually resident in memory 70 and executed by processor 64, functionally organizes the device by, e.g., invoking operations in support of software processes and/or services executing on the device. These software processes and/or services can include routing process/services 74 and a PoRC load balancing process 78, as described herein. Load balancer 78 can be configured to run the power of random choices (PoRC) load balancing scheme described below.

Routing process (services) 74 include computer executable instructions executed by the processor 64 to perform functions provided by one or more routing protocols, such as proactive or reactive routing protocols as will be understood by those skilled in the art. These functions can, on capable devices, be configured to manage a routing/forwarding table (a data structure 76) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (IS-IS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node can be employed to reach the desired destination.

Moreover, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers usually operate with constraints, e.g., processing power, memory, and/or energy (battery), and their interconnects are characterized by, illustratively, high loss rates, low data rates, and/or instability. An example implementation of LLNs is an "Internet of Things" network. Loosely, the term "Internet of Things" or "IoT" can be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, as described below with reference to FIGS. 8 and 9.

Figure 5:
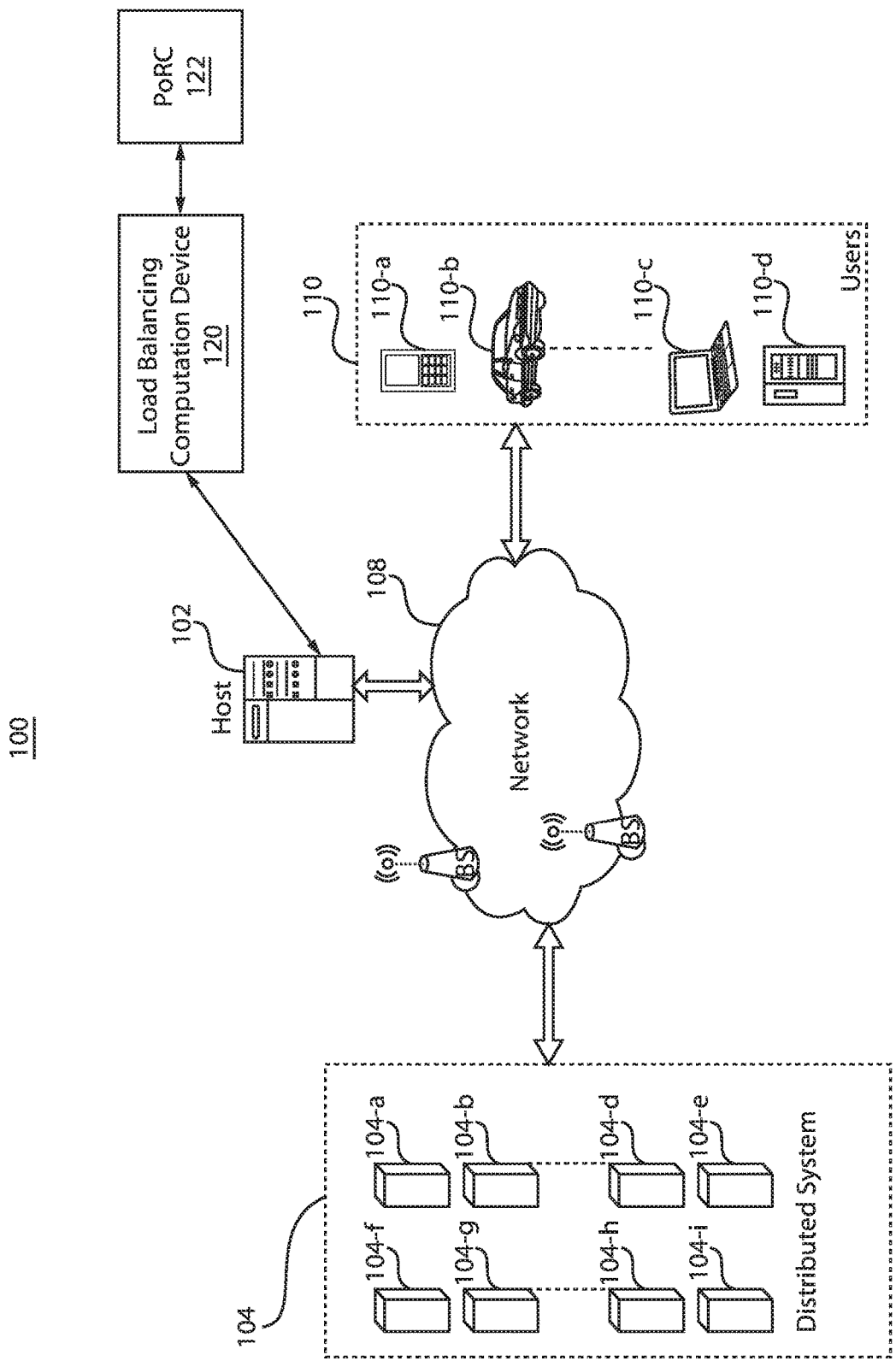
FIG. 5 is a block/flow diagram of an exemplary distributed system in which work load balancing is applied, in accordance with an embodiment of the present invention.

FIG. 5 is a block/flow diagram of an exemplary distributed system in which work load balancing is applied, in accordance with an embodiment of the present invention.

The exemplary system 100 includes a host 102, a distributed system such as a cluster or server or node 104, a network 108, and users 110. The network 108 can be a single network or a combination of different networks. For example, the network 108 can be a local area network (LAN), a wide area network (WAN), a public network, a private network, a proprietary network, a Public Telephone Switched Network (PSTN), the Internet, a wireless network, a virtual network, or any combination thereof. The network 108 can also include various network access points, e.g., wired or wireless access points such as base stations or Internet exchange points 108, through which a data source can connect to the network in order to transmit information via the network.

The cluster 104 in which the work load balancing to be performed can include a plurality of nodes 104-a, 104-b, . . . 104-h, 104-i, which communicate through the network 108 or through an internal network (not shown). The nodes 104-a, 104-b, . . . 104-h, 104-i can include autonomous physical machine, such as a server, a workstation, a desktop or laptop computer, a tablet, a smart phone, a television, a game console, or any other suitable machine. Some or all of the nodes 104-a, 104-b, . . . 104-h, 104-i can be parallel virtual machines implemented by either software emulation or hardware virtualization.

The cluster 104 can be a set of machines owned by one entity, e.g., an enterprise, and maintained as a server farm or server cluster where the servers are mounted on racks in a server room or data center. The cluster 104 can also be a collection of machines owned by different entities and that are physically separate from each other at a distance. Each node 104-a, 104-b, . . . 104-h, 104-i can include one or more resource units, which are physical capacities to which units of work (load-quanta) are assigned. For example, an actual physical resource (node) can have multiple capacities, each having its own load. The resource unit can be a storage unit, e.g., disk and memory, a computing unit, e.g., central processing unit (CPU) and graphics processing unit (GPU), or a combination thereof. In this example, the cluster 104 is a highly distributed, scalable and elastic storage and processing system in which the number of resource units can be dynamically changed, and load can be dynamically shifted among resource units.

Users 110 can be of different types such as users connected to the network via desktop connections (110-d), users connecting to the network via wireless connections such as through a laptop (110-c), a handheld device (110-a), or a built-in device in a motor vehicle (110-b). A user can access the cluster 104 by sending a request to the cluster 104 via the network 108 and receiving a result from the cluster 104 through the network 108.

In this exemplary system 100, an operator, who can be a network administrator, developer, or customer of the cluster 104, can configure the host 102 via an internal or proprietary network connection to perform the work load balancing of the cluster 104. The host 102, in response to the configuration information such as load balancing policies and model parameters, can collect or receive multi-dimensional load metrics from all the resource units of the cluster 104 and compute a load for each resource unit. The operator can use the load balancing computation device 120 of the exemplary embodiments of the present invention. The load balancing computation device 120 can be the power of random choices (PoRC) 122 scheme or algorithm. The PoRC 122 provides bounded imbalance in terms of number of tasks assigned to each machine and keeps the memory, as well as the communication and aggregation cost low. The PoRC 122 introduces the notion of continuous capacity for each machine and assigns the incoming tasks randomly to any machine with spare capacity.

Figure 6:
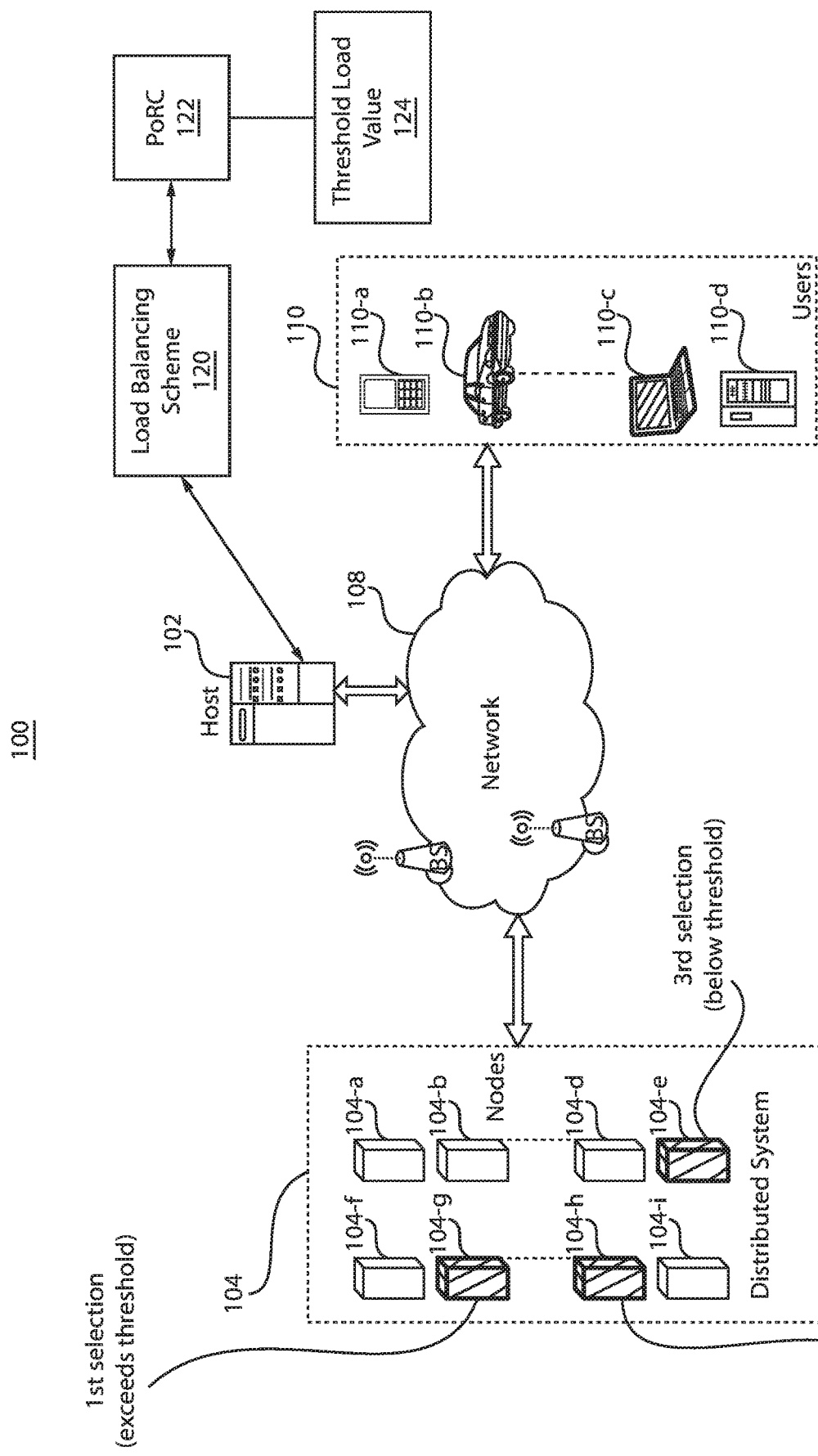
FIG. 6 is a block/flow diagram of an exemplary distributed system where a power of random choices (PoRC) load balancing scheme is applied, in accordance with an embodiment of the present invention.

FIG. 6 is a block/flow diagram of an exemplary distributed system where a PoRC load balancing scheme is applied, in accordance with an embodiment of the present invention.

In one example, a request is sent by the user 110-c to the distributed system 104 via network 108. The load balancing computation device 120 uses the PoRC 122 to determine which node 104 will handle the request by the user 110-c. In one example, a load capacity of each node 104 can first be computed. Based on the load capacity of each node 104, an average load/capacity of all the nodes can be computed. Based on the average load/capacity of all the nodes, a threshold load/capacity value 124 can be set. The PoRC 122 can then randomly select a node 104 from the plurality of nodes.

In this example, the PoRC 122 selects node 104-g to process the request sent from the user 110-c. The PoRC 122 then determines whether the selected node 104-g is above or below the threshold load/capacity value 124. In this instance, it is determined that the selected node 104-g exceeds the threshold load/capacity value 124 set by the PoRC 122. Therefore, node 104-g is not used to process the request made by user 110-c.

The PoRC 122 then selects another node. For example, the PoRC 122 selects node 104-h to process the request sent from the user 110-c. The PoRC 122 then determines, once again, whether the selected node 104-h is above or below the threshold load/capacity value 124. In this instance, it is determined that the selected node 104-h exceeds the threshold load/capacity value 124 set by the PoRC 122. Therefore, node 104-h is also not used to process the request made by user 110-c.

The PoRC 122 then selects another node. For example, the PoRC 122 selects node 104-e to process the request sent from the user 110-c. The PoRC 122 then determines, once again, whether the selected node 104-e is above or below the threshold load/capacity value 124. In this instance, it is determined that the selected node 104-e does not exceed the threshold load/capacity value 124 set by the PoRC 122. Therefore, node 104-e is selected as the node to process the request made by user 110-c.

It is noted that the nodes 104 can be selected based on a hash value. A hash value is a numeric value of a fixed length that uniquely identifies data. Hash values represent large amounts of data as much smaller numeric values, so they are used with digital signatures. In one example, a data structure called a hash table can be employed for rapid data lookup.

The pseudocode for the power of random choices (PoRC) can be given as follows:

Algorithm 1 Pseudocode for Power of Random Choices

1:     procedure GETWORKER(i, , $k_i$, $\mathcal{H}$, t, n, load, $\epsilon$)
2:     $S^* \leftarrow \mathcal{H}(k_i)$
3:     salt $\leftarrow$ 1
4:     while $\left(\text{load}[S^*] >= (1 + \epsilon) * \frac{t}{n}\right)$ do
5:         $S^* \leftarrow \mathcal{H}(k_i + \text{salt})$ -continued Algorithm 1 Pseudocode for Power of Random Choices

| 6: | salt ← salt + 1 |
| 7: | load[S*] ← load[S*] + 1 |
| 8: | return S* |

In one example, PoRC 122 interpolates well between hashing and round robin strategies. PoRC 122 allows the user to trade memory at the cost of imbalance by tuning the parameter epsilon ($\epsilon$). Epsilon is an input parameter to the algorithm. The algorithm ensures that no node in the network has more than epsilon times the average load. As the imbalance is given by the difference between maximum load and average load. Therefore, the imbalance is bounded by the factor of epsilon ($\epsilon$). It is also noted that in the pseudocode above, the term "salt" is a number (natural number) that allows the hash function to select a random node on the network. The "salt" combined with the hash functions allows the same workers or nodes to be selected for each key.

PoRC 122 generates low imbalance and incurs low memory overhead for a Zipf distribution with different skew. The Zipf distribution, sometimes referred to as the zeta distribution, is a discrete distribution commonly used for modelling of rare events. The memory overhead is proportional to the communication and aggregation cost. PoRC 122 can be implemented on a distributed stream processing engine, such as, but not limited to, Apache Storm. Experimental results show a 3.2× superior performance in terms of throughput and 2× superior performance in latency. Therefore, the PoRC 122 has a fundamental impact on resource utilization, execution latency, and throughput.

PoRC 122 has an input parameter $\epsilon$. The capacity of the machines at any time is defined as the ceiling of the average load times (1+$\epsilon$). Further, a set of random permutation of machines for each task is generated employing a set of hash functions. PoRC 122 provides a tradeoff between imbalance and memory using the parameter $\epsilon$. Also, PoRC 122 generalizes both hashing and round robin, i.e., $\epsilon$=0 equals round robin and $\epsilon$=∞ equals key grouping.

Figure 7:
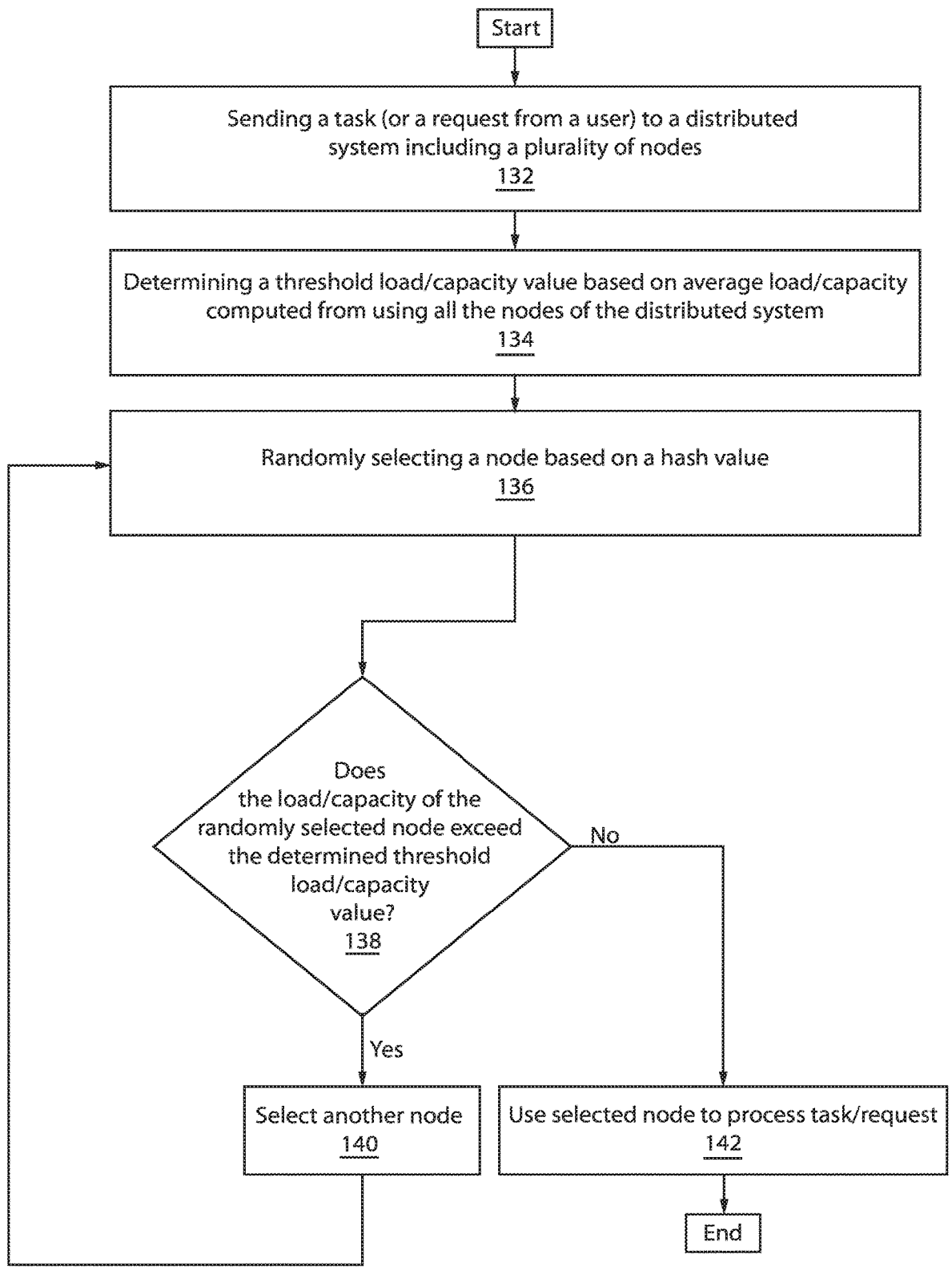
FIG. 7 is a block/flow diagram of an exemplary method for applying a PoRC load balancing scheme, in accordance with an embodiment of the present invention.

FIG. 7 is a block/flow diagram of an exemplary method for applying a PoRC load balancing scheme, in accordance with an embodiment of the present invention.

At block 132, a task or a request from a user is sent to a distributed system including a plurality of nodes. Users can be of different types such as users connected to the network via desktop connections, users connecting to the network via wireless connections such as through a laptop, a handheld device, or a built-in device in a motor vehicle. A user can access the cluster by sending a request to the cluster via the network and receiving a result from the cluster through the network.

At block 134, a threshold load/capacity value is determined based on average load/capacity computed from taking into account all the plurality of nodes of the distributed system.

At block 136, a node is randomly selected based on a hash value. A hash value is a numeric value of a fixed length that uniquely identifies data.

At block 138, it is determined whether the load/capacity of the randomly selected node exceeds the determined threshold load/capacity value.

If YES, the process proceeds to block 140. If NO, the process proceeds to block 142

At block 140, another node is selected. The newly selected node goes through the same process to determine if the newly selected node is above or below the threshold load/capacity value.

At block 142, the selected node is used to process the task/request.

Figure 8:
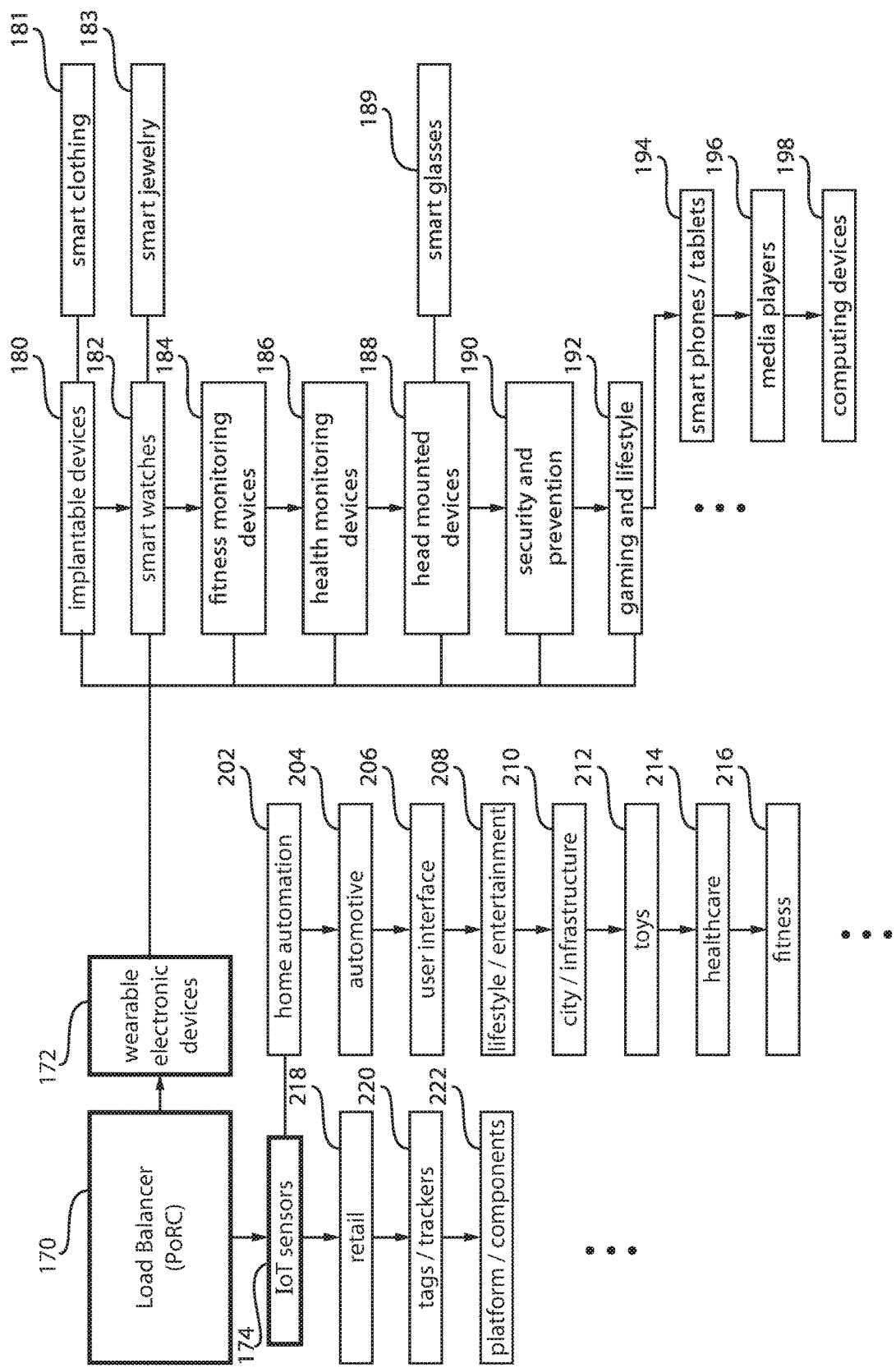
FIG. 8 is a block/flow diagram of a method for applying a PoRC load balancing scheme in Internet of Things (IoT) systems/devices/infrastructure, in accordance with embodiments of the present invention.

FIG. 8 is a block/flow diagram of a method for train applying a PoRC load balancing scheme in Internet of Things (IoT) systems/devices/infrastructure, in accordance with embodiments of the present invention.

According to some embodiments of the invention, a distributed network is implemented using an IoT methodology. For example, the load balancer (PoRC) 170 can be incorporated, e.g., into wearable, implantable, or ingestible electronic devices and Internet of Things (IoT) sensors. The wearable, implantable, or ingestible devices can include at least health and wellness monitoring devices, as well as fitness devices. The wearable, implantable, or ingestible devices can further include at least implantable devices, smart watches, head-mounted devices, security and prevention devices, and gaming and lifestyle devices. The IoT sensors can be incorporated into at least home automation applications, automotive applications, user interface applications, lifestyle and/or entertainment applications, city and/or infrastructure applications, toys, healthcare, fitness, retail tags and/or trackers, platforms and components, etc. The load balancer (PoRC) 170 described herein can be incorporated into any type of electronic devices for any type of use or application or operation.

IoT systems allow users to achieve deeper automation, analysis, and integration within a system. IoT improves the reach of these areas and their accuracy. IoT utilizes existing and emerging technology for sensing, networking, and robotics. Features of IoT include artificial intelligence, connectivity, sensors, active engagement, and small device use. In various embodiments, the load balancer (employing PoRC) 170 of the present invention can be incorporated into a variety of different devices and/or systems. For example, the load balancer (employing PoRC) 170 can be incorporated into wearable or portable electronic devices 172. Wearable/portable electronic devices 172 can include implantable devices 180, such as smart clothing 181. Wearable/portable devices 172 can include smart watches 182, as well as smart jewelry 183. Wearable/portable devices 172 can further include fitness monitoring devices 184, health and wellness monitoring devices 186, head-mounted devices 188 (e.g., smart glasses 189), security and prevention systems 190, gaming and lifestyle devices 192, smart phones/tablets 194, media players 196, and/or computers/computing devices 198.

The load balancer (employing PoRC) 170 of the present invention can be further incorporated into Internet of Thing (IoT) sensors 174 for various applications, such as home automation 202, automotive 204, user interface 206, lifestyle and/or entertainment 208, city and/or infrastructure 210, retail 218, tags and/or trackers 220, platform and components 222, toys 212, and/or healthcare 214, as well as fitness 216. The IoT sensors 174 can communicate with the load balancer (employing PoRC) 170. Of course, one skilled in the art can contemplate incorporating such load balancer (employing PoRC) 170 into any type of electronic devices for any types of applications, not limited to the ones described herein.

Figure 9:
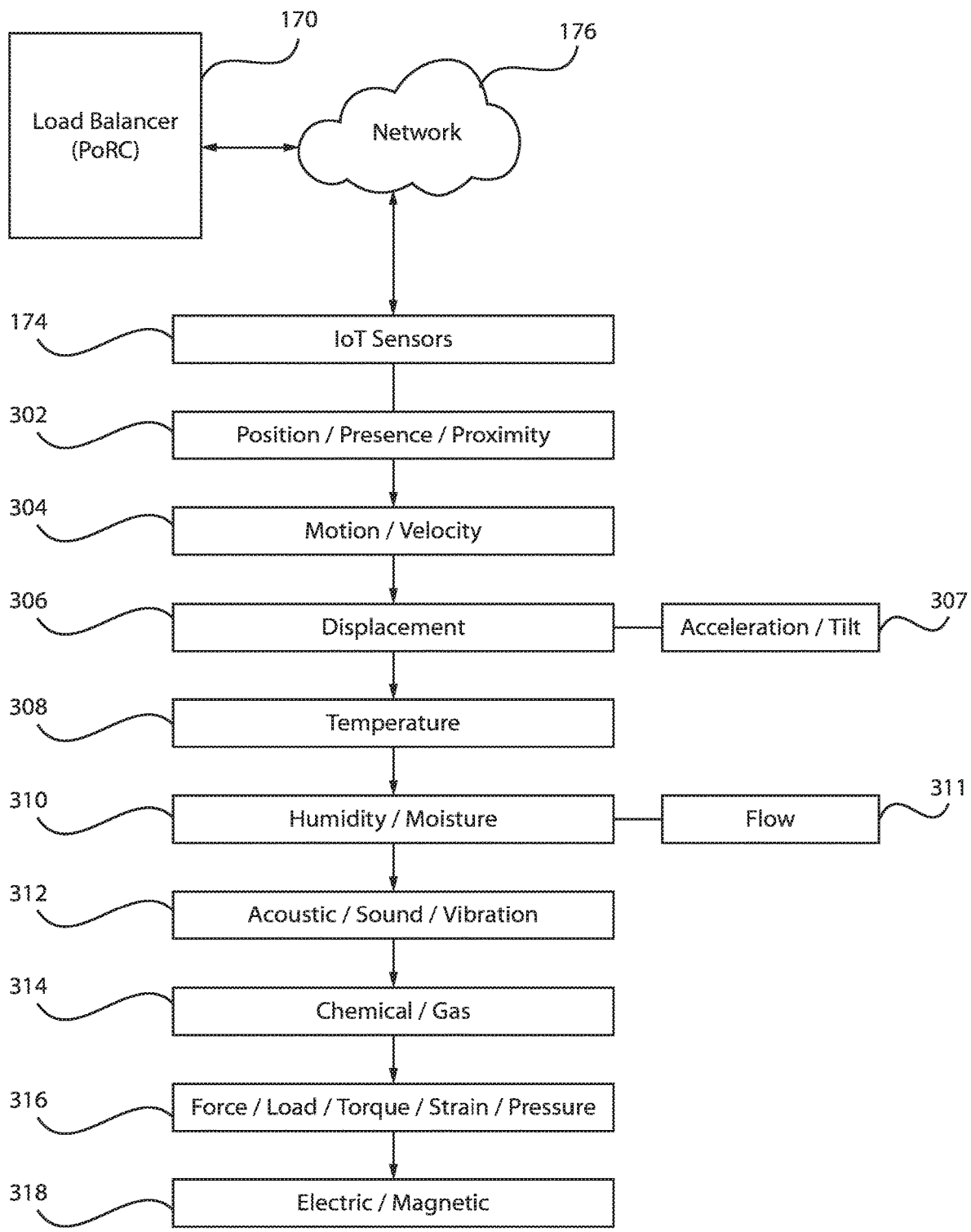
FIG. 9 is a block/flow diagram of exemplary IoT sensors used to collect data/information related to the PoRC load balancing scheme, in accordance with embodiments of the present invention.

FIG. 9 is a block/flow diagram of exemplary IoT sensors used to collect data/information related to the PoRC load balancing scheme, in accordance with embodiments of the present invention.

IoT loses its distinction without sensors. IoT sensors act as defining instruments which transform IoT from a standard passive network of devices into an active system capable of real-world integration.

The IoT sensors 174 can be connected via load balancer (employing PoRC) 170 to transmit information/data, continuously and in real-time, via a network 176, to any type of distributed system. Exemplary IoT sensors 174 can include, but are not limited to, position/presence/proximity sensors 302, motion/velocity sensors 304, displacement sensors 306, such as acceleration/tilt sensors 307, temperature sensors 308, humidity/moisture sensors 310, as well as flow sensors 311, acoustic/sound/vibration sensors 312, chemical/gas sensors 314, force/load/torque/strain/pressure sensors 316, and/or electric/magnetic sensors 318. One skilled in the art can contemplate using any combination of such sensors to collect data/information and input into the load balancer (PoRC) 170 of the distributed system for further processing. One skilled in the art can contemplate using other types of IoT sensors, such as, but not limited to, magnetometers, gyroscopes, image sensors, light sensors, radio frequency identification (RFID) sensors, and/or micro flow sensors. IoT sensors can also include energy modules, power management modules, RF modules, and sensing modules. RF modules manage communications through their signal processing, WiFi, ZigBee®, Bluetooth®, radio transceiver, duplexer, etc.

Figure 10:
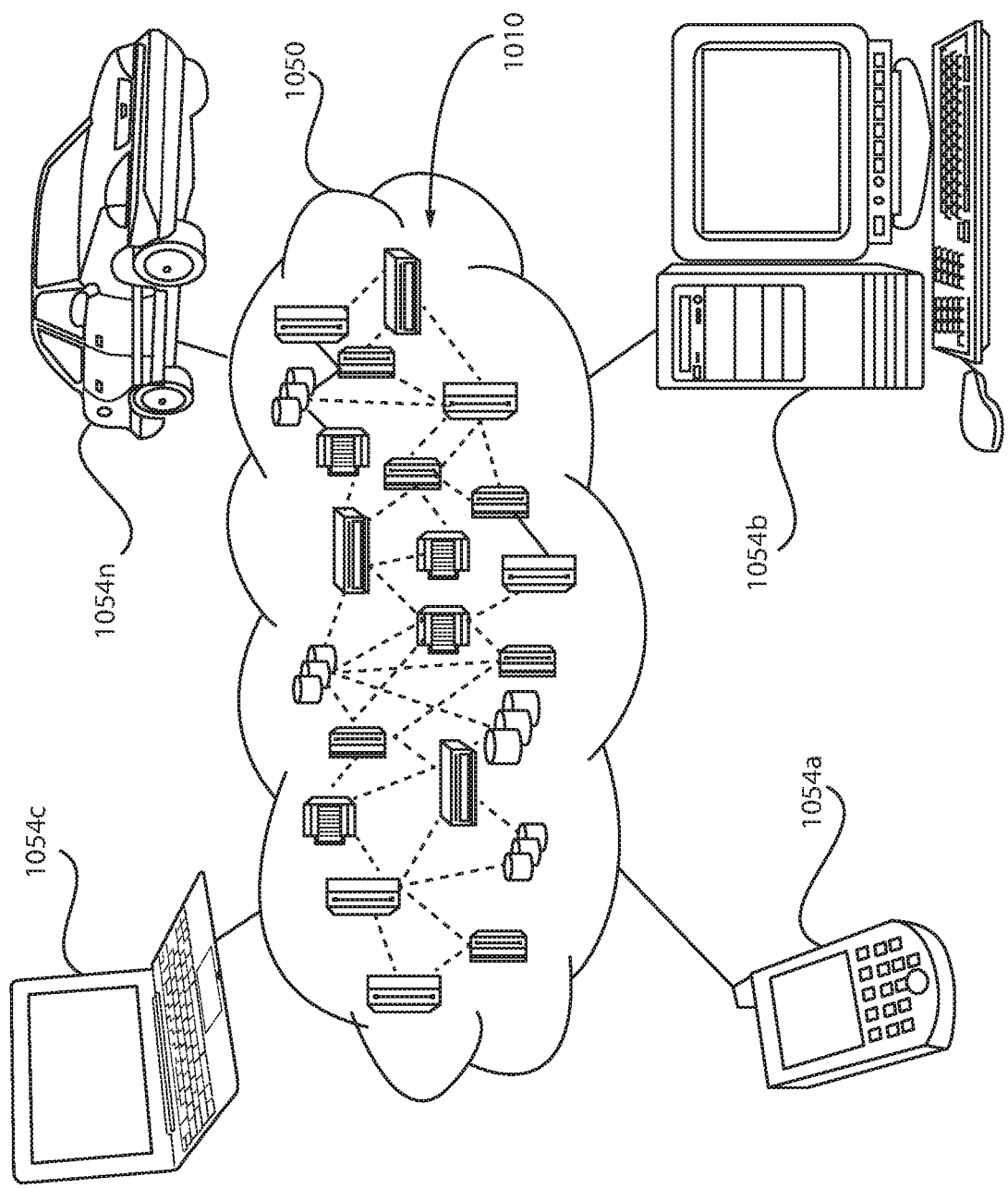
FIG. 10 is a block/flow diagram of an exemplary cloud computing environment, in accordance with an embodiment of the present invention.

FIG. 10 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 10, illustrative cloud computing environment 1050 is depicted for enabling use cases of the present invention. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N can communicate. Nodes 1010 can communicate with one another. They can be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
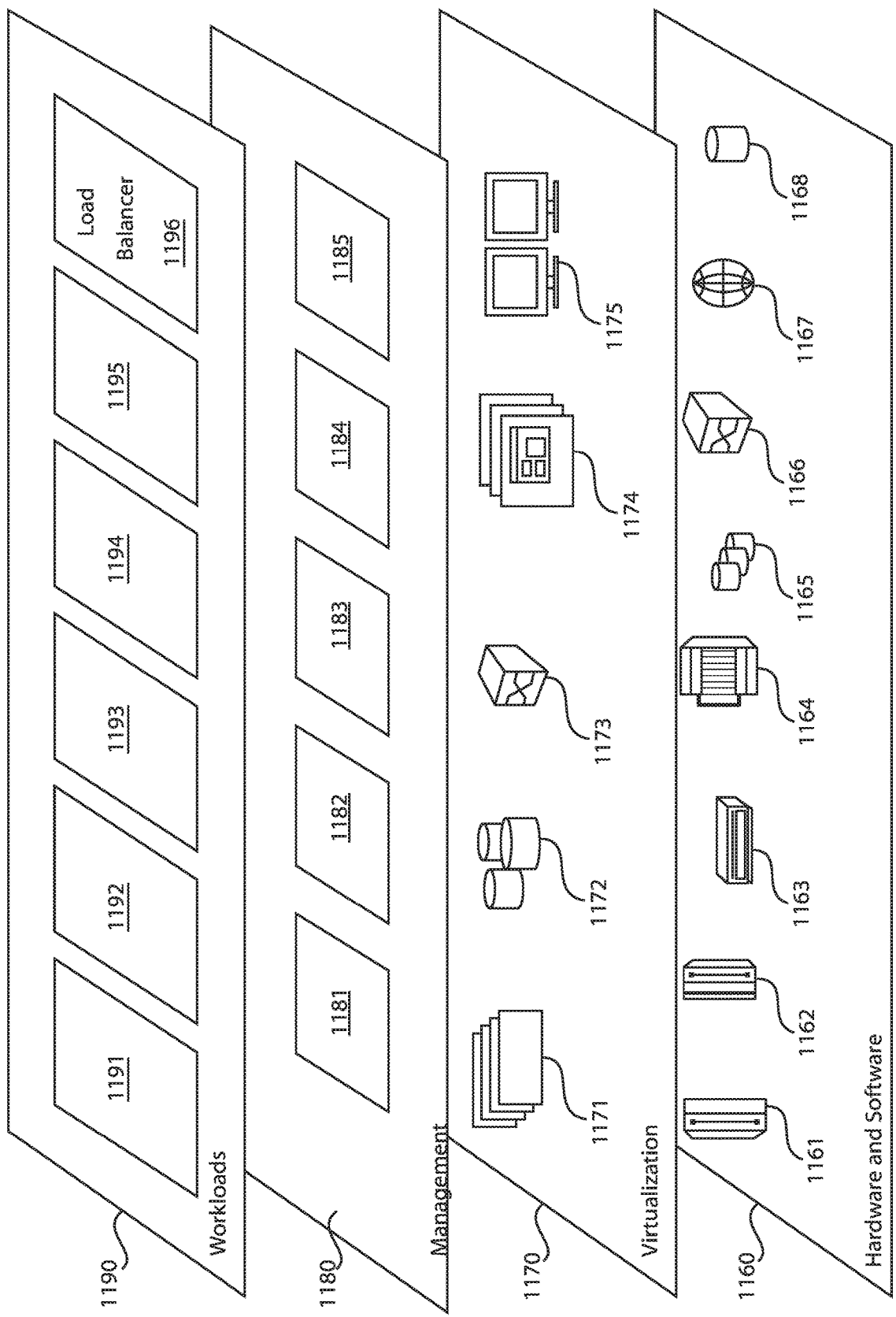
FIG. 11 is a schematic diagram of exemplary abstraction model layers, in accordance with an embodiment of the present invention.

FIG. 11 is a schematic diagram of exemplary abstraction model layers, in accordance with an embodiment of the present invention. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities can be provided: virtual servers 1171; virtual storage 1172; virtual networks 1173, including virtual private networks; virtual applications and operating systems 1174; and virtual clients 1175.

In one example, management layer 1180 can provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment can be utilized. Examples of workloads and functions which can be provided from this layer include: mapping and navigation 1191; software development and lifecycle management 1192; virtual classroom education delivery 1193; data analytics processing 1194; transaction processing 1195; and load balancer (employing PoRC) 1196.

Still yet, any of the components of the present invention could be created, integrated, hosted, maintained, deployed, managed, serviced, etc. by a service supplier who offers to provide a method for performing load balancing. Thus, the present invention describes a process for deploying, creating, integrating, hosting, maintaining, and/or integrating computing infrastructure, including integrating computer-readable code into the distributed network, wherein the code is capable of performing a method for load balancing. In another embodiment, the invention provides a business method that performs the process blocks/steps of the invention on a subscription, advertising, and/or fee basis. That is, a service supplier, such as a Solution Integrator, could offer to provide a method for load balancing. In this case, the service supplier can create, maintain, support, etc. a computer infrastructure that performs the process blocks/steps of the invention for one or more customers. In return, the service supplier can receive payment from the customer(s) under a subscription and/or fee agreement and/or the service supplier can receive payment from the sale of advertising content to one or more third parties.

The descriptions of the various embodiments of the present invention have been presented for purposes of illustration, but are not intended to be exhaustive or limited to the embodiments described. Many modifications and variations will be apparent to those of ordinary skills in the art without departing from the scope and spirit of the described embodiments. The terminology used herein was chosen to best explain the one or more embodiments, the practical application or technical improvement over technologies found in the marketplace, or to enable others of ordinary skills in the art to understand the embodiments described herein.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for balancing loads of a distributed system having a plurality of nodes via a load balancing scheme (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method executed on a processor for balancing loads of a distributed system having a plurality of nodes via a load balancing scheme, the method comprising:
   determining a load of each of the plurality of nodes once a request is sent to the distributed system;
   using the load of each of the plurality of nodes of the entire distributed system implemented across a plurality of different technological areas to compute a single average load therefrom to set a single threshold load value, the single threshold value derived from processing all the plurality of nodes of the entire distributed system implemented across the plurality of different technological areas;
   randomly selecting, via a single load balancing computation device, a node of the plurality of nodes based on a hash value;
   determining whether the randomly selected node is operated above or below the single threshold load value derived from processing all the plurality of nodes of the entire distributed system implemented across the plurality of different technological areas; and
   if the randomly selected node is operated above the single threshold load value, randomly selecting another node via the single load balancing computation device, and if the randomly selected node is operated below the single threshold load value, then selecting such node to process the request.

2. The method of claim 1, further comprising computing the hash value from a task key identifying a task group.

3. The method of claim 1, wherein the load balancing scheme provides a bounded imbalance given by the difference between the single threshold load value and the average load.

4. The method of claim 3, wherein the bounded imbalance is bounded by a factor of parameter epsilon, epsilon being an input parameter to the load balancing scheme.

5. The method of claim 4, wherein the load balancing scheme ensures that no node in the distributed system has more than epsilon times the average load.

6. The method of claim 5, wherein the load balancing scheme establishes a relationship between bounded imbalance and memory by tuning the parameter epsilon.

7. The method of claim 1, further comprising implementing the load balancing scheme by a distributed stream processing engine.

8. A load balancing system for balancing loads via a load balancing scheme, the system comprising:
   a distributed system including a plurality of nodes;
   a plurality of computing devices transmitting a plurality of requests to the distributed system via one or more networks; and
   a load balance computation device for executing the load balancing scheme to:
      determine a load of each of the plurality of nodes once a request of the plurality of requests is sent to the distributed system;
      use the load of each of the plurality of nodes of the entire distributed system implemented across a plurality of different technological areas to compute a single average load therefrom to set a single threshold load value, the single threshold value derived from processing all the plurality of nodes of the entire distributed system implemented across the plurality of different technological areas;
      randomly select, via a single load balancing computation device, a node of the plurality of nodes based on a hash value;
      determine whether the randomly selected node is operated above or below the single threshold load value derived from processing all the plurality of nodes of the entire distributed system implemented across the plurality of different technological areas; and
      if the randomly selected node is operated above the single threshold load value, randomly select another node via a single load balancing computation device, and if the randomly selected node is operated below the single threshold load value, then select such node to process the request.

9. The system of claim 8, wherein the hash value is computed from a task key identifying a task group.

10. The system of claim 8, wherein the load balancing scheme provides a bounded imbalance given by the difference between the single threshold load value and the average load.

11. The system of claim 10, wherein the bounded imbalance is bounded by a factor of parameter epsilon, epsilon being an input parameter to the load balancing scheme.

12. The system of claim 11, wherein the load balancing scheme ensures that no node in the distributed system has more than epsilon times the average load.

13. The system of claim 12, wherein the load balancing scheme establishes a relationship between bounded imbalance and memory by tuning the parameter epsilon.

14. The system of claim 8, the load balancing scheme is implemented by a distributed stream processing engine.

15. A non-transitory computer readable storage medium comprising a computer readable program for balancing loads of a distributed system including a plurality of nodes via a load balancing scheme, wherein the computer readable program when executed on a computer causes the computer to perform the steps of:
   determining an average load of the plurality of nodes once a request is sent to the distributed system;
   determining a load of each of the plurality of nodes once a request is sent to the distributed system;
   using the load of each of the plurality of nodes of the entire distributed system implemented across a plurality of different technological areas to compute a single average load therefrom to set a single threshold load value, the single threshold value derived from processing all the plurality of nodes of the entire distributed system implemented across the plurality of different technological areas;
   randomly selecting, via a single load balancing computation device, a node of the plurality of nodes based on a hash value;
   determining whether the randomly selected node is operated above or below the single threshold load value derived from processing all the plurality of nodes of the entire distributed system implemented across the plurality of different technological areas; and
   if the randomly selected node is operated above the single threshold load value, randomly selecting another node via the single load balancing computation device, and if the randomly selected node is operated below the single threshold load value, then selecting such node to process the request.

16. The non-transitory computer readable storage medium of claim 15, wherein the hash value is computed from a task key identifying a task group.

17. The non-transitory computer readable storage medium of claim 15, wherein the load balancing scheme provides a bounded imbalance given by the difference between the single threshold load value and the average load.

18. The non-transitory computer readable storage medium of claim 17, wherein the bounded imbalance is bounded by a factor of parameter epsilon, epsilon being an input parameter to the load balancing scheme.

19. The non-transitory computer readable storage medium of claim 18, wherein the load balancing scheme ensures that no node in the distributed system has more than epsilon times the average load.

20. The non-transitory computer readable storage medium of claim 19, wherein the load balancing scheme establishes a relationship between bounded imbalance and memory by tuning the parameter epsilon.

* * * * *